United States Patent [19]
Margolin

[11] 3,990,327
[45] Nov. 9, 1976

[54] MULTIPLE RANGE HYDROSTATIC TRANSMISSION MECHANISM

[75] Inventor: William Margolin, Troy, Mich.

[73] Assignee: Ford Motor Company, Dearborn, Mich.

[22] Filed: Jan. 8, 1975

[21] Appl. No.: 539,572

[52] U.S. Cl. .................... 74/687; 74/720; 74/720.5; 74/665 R
[51] Int. Cl.² ........................................ F16H 47/04
[58] Field of Search ............... 74/665 R, 720, 720.5, 74/687

[56] References Cited
UNITED STATES PATENTS

| | | | |
|---|---|---|---|
| 3,470,769 | 10/1969 | Livezey | 74/687 X |
| 3,596,535 | 8/1971 | Polak | 74/720.5 |
| 3,855,879 | 12/1974 | DeLalio | 74/720.5 X |

*Primary Examiner*—Samuel Scott
*Assistant Examiner*—Frank H. McKenzie, Jr.
*Attorney, Agent, or Firm*—Donald J. Harrington; Keith L. Zerschling

[57] ABSTRACT

A transmission mechanism adapted especially for agricultural and industrial tractors and for heavy construction vehicles comprising a pair of hydrostatic pump-and-motor units arranged in a closed hydrostatic fluid flow circuit, a planetary gear unit and geared connections between separate elements of the gear unit and the rotor for each hydrostatic unit, each geared connection having its characteristic speed ratio thereby defining multiple speed ranges within which an infinite torque ratio variation is achieved.

4 Claims, 6 Drawing Figures

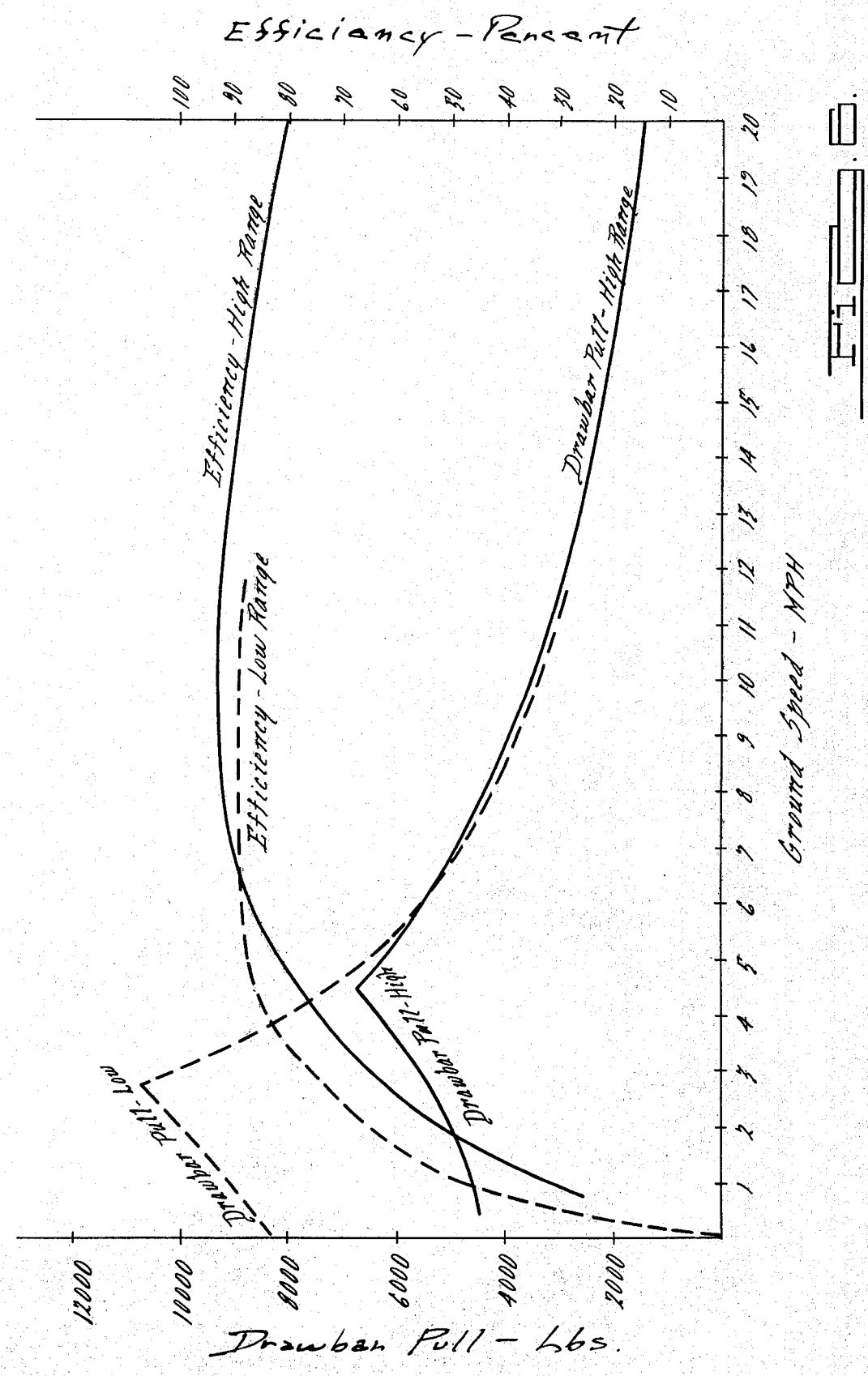

MULTIPLE RANGE HYDROSTATIC TRANSMISSION MECHANISM

GENERAL DESCRIPTION OF THE INVENTION

I will describe in this specification a hydromechanical power transmission mechanism adapted especially for tractor vehicles. Drivelines for such vehicles should be designed for continuous operation at a fixed ratio for long periods. Drive range changes should be made under zero torque conditions or at relatively reduced relative speeds of the torque delivery elements of the transmission so that lurching and shock loading of the driveline will be avoided. I have achieved these objectives by providing a split power torque delivery path, one portion of the torque delivery path being defined by a hydrostatic pump and motor system and the other portion being a torque multiplying gear arrangement. Such split torque power delivery from the engine to the ground engaging wheels or tracks makes it possible to operate the vehicle with continuous drawbar loads while maintaining a relatively high degree of efficiency. The engine operates at relatively constant speed thereby making it possible to choose the most efficient point in the speed torque relationship that is characteristic of that engine.

My design is an improvement in prior art designs of the type shown, for example, in Baker U.S. Pat. No. 3,132,533 where hydrostatic pump-and-motor units are used in a tractor driveline. The improved design of my invention employs separate geartrains for low range and high range to multiply torque delivered from the engine through the fully mechanical drive portion of the torque delivery path while the balance of the torque is distributed through the hydrostatic portion. The hydrostatic units, furthermore, act as a reaction point for the planetary gear unit and the fully mechanical gearing of the driveline.

The motion of the reaction element relative to the speed of the engine crankshaft can be varied by controlling the relative displacements of the hydrostatic pump-and-motor units. In this way the portion of the torque being delivered hydrostatically is varied from a maximum to a minimum, at which point the driveline is fully mechanical. This torque ratio variation can be achieved in each drive range depending upon which torque multiplying gearset is employed. Furthermore, a reverse drive gearset, in addition to the forward drive range gears, is included in the gear system for reversing the direction of torque delivery to the power output shaft.

My design includes a mechnical shifter mechanism for changing gear ratios in the gear system and this same shifter mechanism is used to obtain an infinite variation in relative displacements of the hydrostatic units in any of the selected drive ranges. A single level control thus may be used for obtaining a full range of speed ratios in any one of the selected drive ranges.

A feature of my invention that distinguishes it from known hydrostatic transmission systems, such as that shown in Baker U.S. Pat. No. 3,132,533, is its ability to establish a split torque delivery path during operation in low speed ranges. In this operating condition a first of the two hydrostatic units operates as a pump and the second operates as a motor. Both hydrostatic units have a variable angle swashplate which serves as the torque input or torque output element. The swashplate of the first hydrostatic unit is connected to the reaction element of the planetary gearset and the swashplate of the second hydrostatic unit is adapted to be clutched to the outut gears as the first hydrostatic unit is stroked to establish a torque delivery condition in the lower speed drive range. Power is distributed hydrostatically from the first hydrostatic unit to the second hydrostatic unit and the balance of the torque is distributed mechanically through the gear system.

In the present embodiment, a first of the hydrostatic units drives the carrier for the gear system after the second hydrostatic unit reaches maximum displacement. Further increases in output speed can be achieved by decreasing displacement of the first hydrostatic unit. After the first hydrostatic unit achieves a zero displacement condition the second hydrostatic unit cannot rotate and all power at that point is distributed mechanically.

If the first hydrostatic unit is stroked to a negative displacement position, it becomes a pump and the second hydrostatic unit becomes a motor. The point at which this lockup occurs depends upon the ratio of the input planetary gear unit and is reached only when the motor displacement becomes zero. This is the ideal point for a shift from low ratio drive range to high ratio drive range since the low ratio clutch can be disengaged and the high ratio clutch can be engaged under zero torque conditions.

When the first hydrostatic unit acts as a pump and the second hydrostatic unit acts as a motor, which is the case when the first hydrostatic unit is moved to a negative displacement position, a substantial amount of reaction torque is present which causes an increase in the internal hydrostatic pressure. As the hydrostatic pressure in the pump and motor circuit is increased there is a parasitic horsepower loss, and as the speed increases in the higher speed range the overall efficiency tends to decrease.

In contrast to this pump and motor arrangement, prior art drives such as that illustrated in the Baker patent cause a high horsepower loss in the low speed range where most of the constant-load, low speed operation occurs in an industrial or agricultural tractor driveline. The overall operating efficiency for such conventional drives during normal continuous load operation then is less than that which can be achieved with my hydrostatic drive. The parasitic horsepower losses due to the presence of high reaction torque acting on the hydrostatic pump and motor units, and the resulting high pressures against which the units must act, result in an internal horsepower transfer in the hydrostatic portion of the driveline that may be as much as three times as great as the horsepower developed by the engine.

BRIEF DESCRIPTION OF THE FIGURES OF THE DRAWINGS

FIG. 6 is a chart showing the forms of the transmission where ground speed is plotted against drawbar pull for both high range operation and low range operation.

PARTICULAR DESCRIPTION OF THE INVENTION

Figure 1:
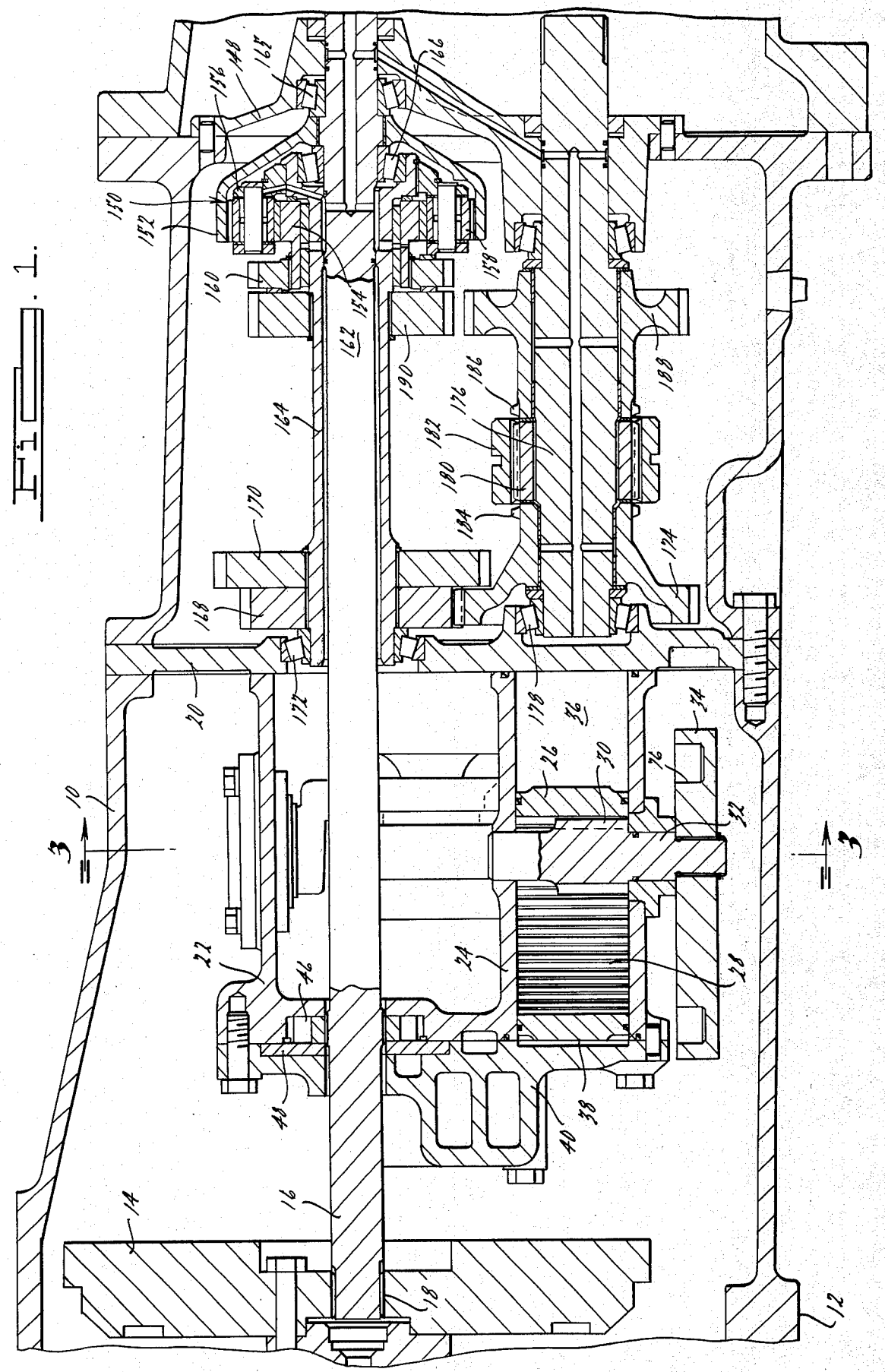
FIG. 1 is a cross sectional view taken along a longitudinal axis of the transmission mechanism of my invention.

Numeral 10 represents in FIG. 1 a main transmission case which is adapted to be bolted at its left-hand margin 12 to the engine block of a tractor engine. The engine flywheel is shown at 14. A power input shaft 16 is splined at 18 to the flywheel. The flywheel 14 forms a part of a friction clutch mechanism which may be of conventional construction for selectively engaging and disengaging the engine input shaft 16.

The right-hand end of the housing 10 is bolted to a bearing support plate 20 secured to the left-hand face of support plate 20. Cylinder portion 24 of casting 22 receives a double acting piston 26, the center portion of which is recessed and formed with rack teeth 28. These teeth engage a drive pinion 30 supported on a pinion shaft 32 which extends transversely with respect to the axis of the cylinder portion 24. The outboard end of the shaft 32 carries a rotary cam 34. A pressure chamber 36 is located at the right-hand end of the piston 26 within the cylinder portion 24 and a pressure chamber 38 is located at the opposite end of the piston 26. The left-hand end of the casting 22 has secured thereto a closure member 40 which covers the left-hand end of the cylinder portion 24 and which defines internal porting and passages hydrostatically connecting the hydrostatic units 42 and 44 shown in FIG. 2.

A positive displacement lubrication pump and fluid makeup pump is shown at 46. It includes a pump drive member 48 connected to the shaft 16 and porting and internal passages formed in seal plate 48 and in the adjacent closure member 40.

The hydrostatic unit 44 includes reciprocating pistons 50 which engage slidably an adjustable swashplate 52. The rotor shafts 54 and 56 are journalled in bearings 58 and 60, respectively, as seen in FIG. 3. These in turn are supported in casting 22. The axis of oscillation of the swashplate 52 is shown at 62 in FIG. 2 and FIG. 3. The cylinders within which the pistons 50 reciprocate are comprised of a cylinder body or rotor that is journalled at its left-hand end in bearing 64, which is received within a bearing opening formed in the closure member 40. The right-hand end of the rotor has connected thereto or formed thereon a rotor shaft 66 journalled by bearing assembly 68 in a bearing sleeve 70 which forms a part of the bearing support wall 20.

Figure 4:
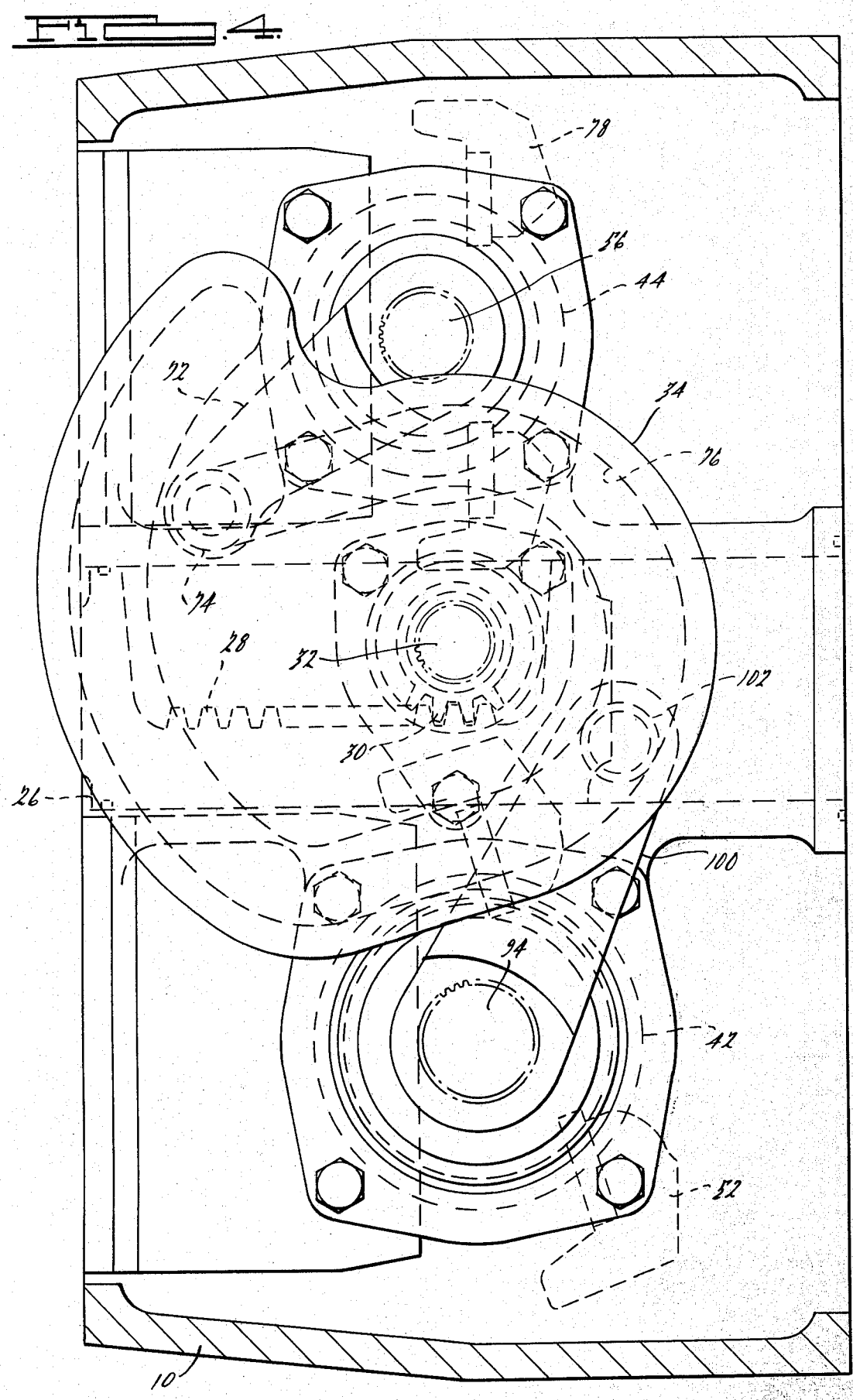
FIG. 4 is a side elevation view of the structure shown in FIG. 3.

As the rotor for the hydrostatic unit 42 rotates, the pistons 50 reciprocate and the stroke of the pistons is determined by the angle of adjustment of the swashplates 52. That angle can be changed by the rotary cam 34 by reason of the mechanical connection between the cam 34 and the swashplate 52. This mechanical connection is established by adjusting arm 72 which is splined to the end of the shaft 56. The end of the arm 72 has a roller cam follower 74 received within cam recess 76. As indicated in FIG. 4, the cam recess 76 extends around the axis of the drive pinion shaft 32 and radial displacement of the cam follower for any given angular position of the cam 34 is calibrated so that the relationship between the angular adjustment of the arm 32 for any given angular adjustment of the cam 34 is predetermined.

The second hydrostatic unit 44 includes an adjustable swashplate 78 which is engaged by reciprocating pistons 80 carried in cylindrical openings formed in the rotor body, the left-hand end of which is journalled by bearing assembly 82 located in a bearing pocket formed in the closure member 40. The stroke of the pistons 80 is varied by changing the angularity of the swashplate 78 which is adapted to oscillate about axis 84. The right-hand end of the rotor for the hydrostatic unit 44 is connected to or formed integrally with a rotor shaft 86 which is journalled by bearing assembly 88 supported in bearing sleeve 90, the latter forming a part of the bearing support wall 20.

Swashplate 78 has a pair of oppositely disposed support shafts 92 and 94 journalled respectively by bearing assemblies 96 and 98. These bearing assemblies are located in bearing openings formed in the casting 22.

The right-hand end of the support shaft 94, as indicated in FIG. 3, is splined to swashplate adjusting arm 100. The extended end of the arm 100 carries a roller cam follower 102 which is received within cam recess 76. As explained previously, the cam recess 76 forms a cam track for changing the radial position of the cam follower with respect to the rotary axis of the cam 34. In this way the angularity of the arm 100 and the angularity of the swashplate 78 is changed.

The rotor shaft 86 is coupled to intermediate shaft 104 by means of coupler collar 106. The collar 106 is integrally splined to receive the splined ends of shaft 104 and shaft 86. A low speed ratio drive gear 108 is supported on shaft 104 by bushings 110 and 112. Shaft 104 in turn is journalled on the bearing support wall 20 by bearing 114 at its left-hand end. The right-hand end of the shaft 104 is journalled on the housing 116 by means of bearing 118. The right-hand end of the shaft 104 rotatably supports reverse drive gear 120 which is journalled on shaft 104 by bushing 122. The bearing 118 is received within a pocket in the gear 120 thereby supporting the shaft 104.

The housing 116 is bolted by means of bolts 124 to the right-hand end of the housing 10. The right-hand end of gear 108 has external clutch teeth 126 and left-hand end of the gear 120 has external clutch teeth 128. An internally splined clutch sleeve 130 is adapted to slide in either axial direction into clutching engagement with the teeth 126 and 128. Sleeve 130 is supported on externally splined clutch hub 132. When the sleeve 130 is shifted in a left-hand direction into engagement with teeth 126, a low speed ratio torque delivery path is completed. Shifting movement in the opposite direction will complete a high speed ratio torque delivery path.

The rotor shaft 66 for the hydrostatic unit 42 is driveably coupled to intermediate torque delivery shaft 134 by splined coupling collar 136. Shaft 134 is journalled by bearing 138 in a bearing support 140 which forms a part of the housing 116. The right-hand end of the shaft 134 is splined to drive gear 142 and to drive gear 144, the former forming a part of the high speed ratio drive range gearing and the reverse drive gearing and the latter forming a part of the hydrostatic torque delivery path for the hydrostatic unit 42. Shaft 134 extends in a right-hand direction as viewed in FIG. 2 where it is journalled by bearing 146 in a bearing pocket formed in end closure 148, said closure forming a part of the housing 116.

Figure 2:
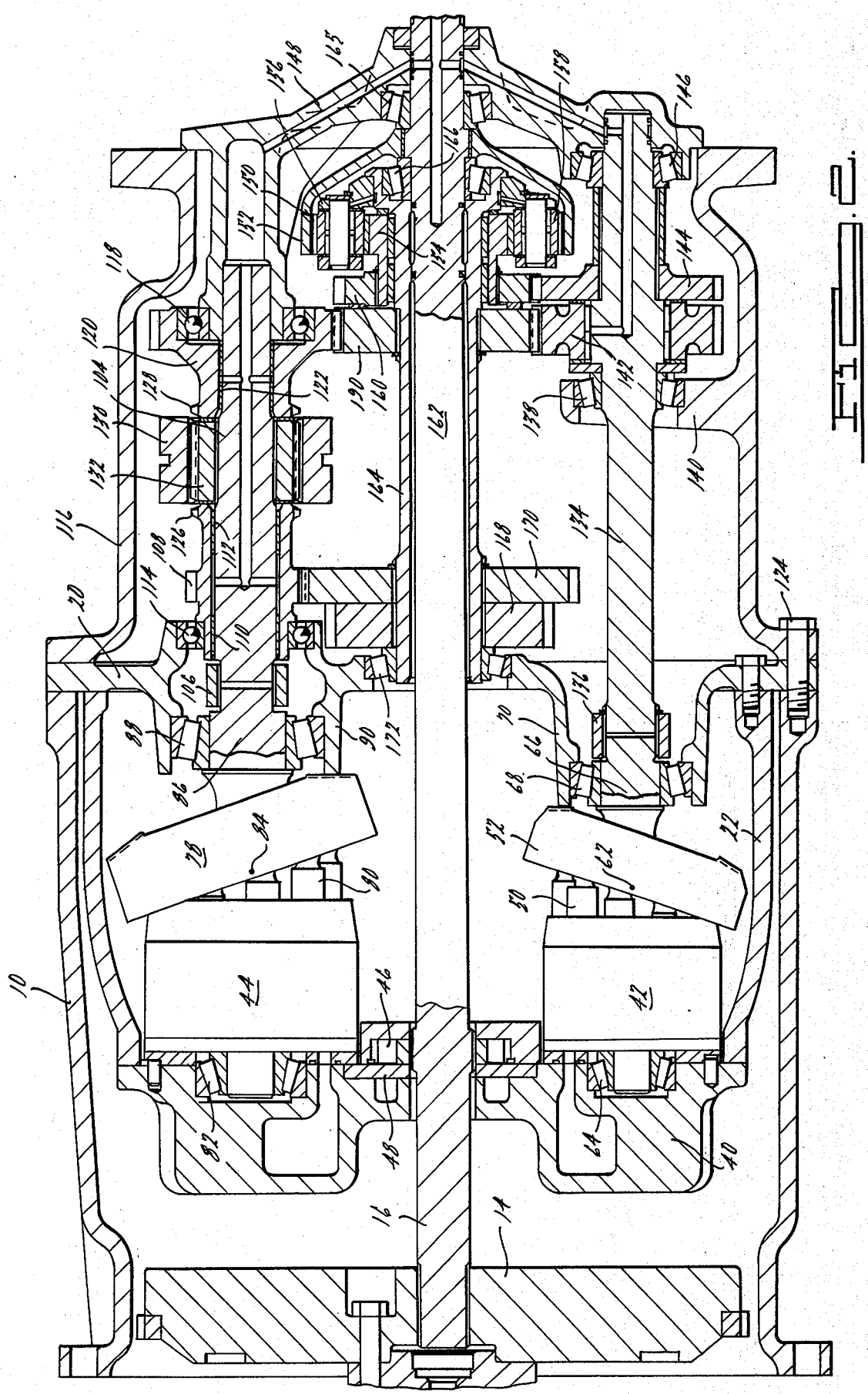
FIG. 2 is another cross sectional view of my transmission mechanism taken along a longitudinal axis situated on a plane that is displaced 90° from the plane of a cross section of FIG. 1.
Figure 3:
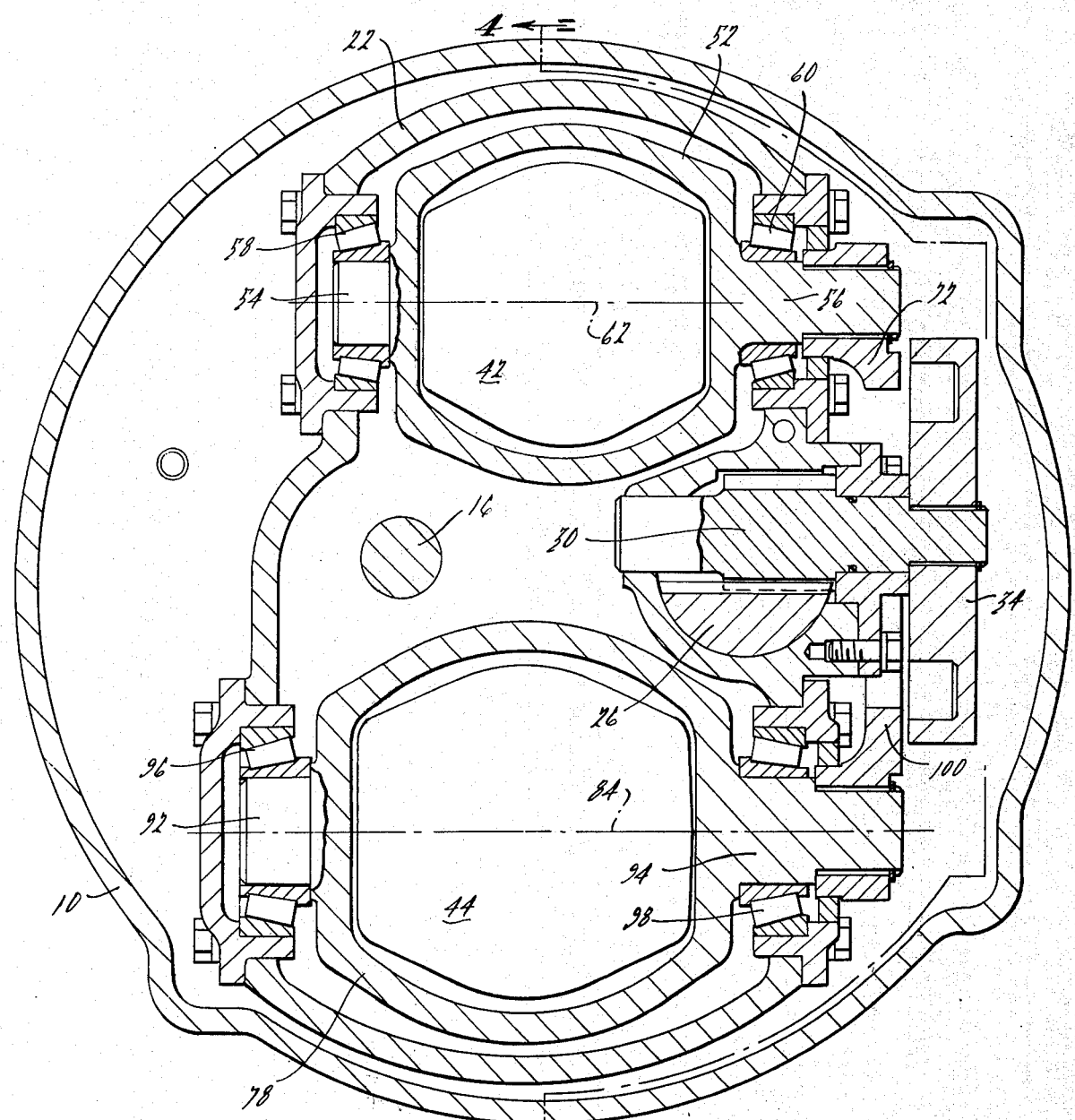
FIG. 3 is a transverse cross sectional view taken along the plane of section line 3-3 of FIG. 1.

A plantetary gear system 150 is located at the right-hand end of the assembly shown in FIGS. 1 and 2. The planetary gear system includes a ring gear 152, sun gear 154, carrier 156 and planet pinions 158 journalled on the carrier 156. Sun gear 154 is splined to drive gear 160 which continuously meshes with drive gear 144.

Ring gear 152 is splined to torque input shaft 162. The right-hand end of the shaft 162 extends through an opening in the closure member 148 so that it may serve as a power takeoff shaft. Bearing 165 journals the right-hand end of the shaft 162 in the closure member 148.

Carrier 156 is connected to sleeve shaft 164 which surrounds shaft 162. It is journalled on the shaft 162 by bearing 166. The forward drive gear 168 and the low speed ratio drive gear 170 are splined to the left-hand end of the sleeve shaft 164. Bearing 172 journals the left-hand end of the sleeve shaft 164 and a bearing opening formed in the bearing support wall 22.

Forward drive gear 168 engages drive gear 174 as shown in FIG. 1. Gear 170 engages gear 108 as shown in FIG. 2.

FIG. 1 shows a power output shaft at 176. It is journalled at its left-hand end by bearing 178 located in a pocket formed in the bearing support wall 20. Output shaft 176 carries a clutch hub 180 on which is splined a clutch sleeve 182 with internal teeth. These teeth engage external teeth 184 formed on the hub of gear 174 when the sleeve 182 is shifted in a left-hand direction. When it is shifted in a right-hand direction the sleeve engages external teeth 186 formed on the hub of reverse gear 188. Gears 174 and 188 are journalled by bushings on shaft 176.

Gear 142 engages reverse drive gear 190 which is splined to sleeve shaft 164. Gear 142 engages also the output gear 188 during reverse drive. Clutch sleeve 182 is shifted in a right-hand direction during reverse drive.

Figure 5:
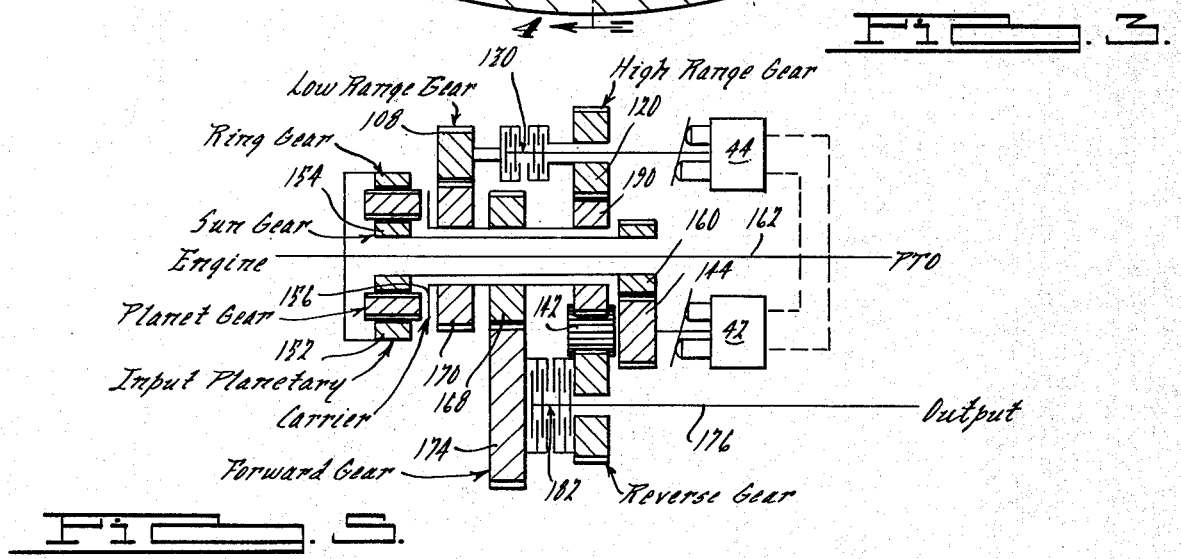
FIG. 5 is a schematic representation of the elements of the transmission mechanism of FIGS. 1 through 4.

FIG. 5 shows in schematic form the power flow path that is described with reference to FIGS. 1 through 4. It differs from the embodiment of FIGS. 1 through 4, however, by the inclusion of power shift or clutches that take the place of the clutch sleeves and clutch teeth associated with the sleeves 130 and 182. For purposes of illustration, however, the disc type power shift clutches of FIG. 5 have been identified by the same reference characters that are used to identify the positive drive clutches of the embodiment of FIGS. 1 through 4.

In the embodiment of FIGS. 1 through 4 the clutch sleeves 130 and 182 may be shifted by a power cylinder which in turn can be actuated and deactivated by a pressure distributor valve under the control of the vehicle operator. Such an adaptation might be useful in an industrial tractor driveline although the embodiments shown in FIGS. 1 through 4 would be quite suitable for use in an agricalatural tractor driveline where there is less need to effect changes in the drive ranges once operation in any given range is initiated. If a change in the drive range is required, a shifting movement can be made after the vehicle is brought to a stop or when the clutch sleeves and the associated clutch teeth are brought into synchronism with a substantially zero relative speed.

If it is assumed for purposes of this description that the vehicle is accelerated from a standing start in a low speed ratio range, clutch sleeve 130 will be shifted in a left-hand direction, hydrostatic unit 42 will be at zero displacement and hydrostatic unit 44 will be at full displacement. The carrier 156, under the initial starting conditions, is stopped when the output shaft speed is zero. The engine then is unloaded except for minor losses due to friction and windage.

As the swash plate angle for swash plate 52 is stroked from the zero displacement position, it begins to operate as a pump thereby causing hydrostatic unit 44 to turn the carrier 156 in the direction of rotation of the input shaft. Hydrostatic unit 44, since it is in a closed hydrostatic circuit with the hydrostatic unit 42, begins to operate as a motor and forms a portion of the torque delivery path between the engine and the output shaft. Thus, a split torque delivery condition is established with a portion of the torque being distributed mechanically and the balance being distributed hydrostatically. The torque required to drive hydrostatic unit 42 is equivalent to engine load. The carrier torque is approximately 1.6 times the input shaft torque and that multiplied torque is transmitted to the output shaft through the forward drive gearset which comprises gears 168 and 174. The hydrostatic portion of the torque delivery path is defined by gear 120 and gear 190 as well as by the gears 168 and 174 which are common to the mechanical torque delivery path. The speed ratios vary by changing the relative displacements of the hydrostatic units. When the hydrostatic unit 142, which is operating as a pump during the acceleration period from a standing start, reaches a maximum displacement position, a further output speed increase can be achieved by decreasing the displacement of the hydrostatic unit 44. This causes the carrier 156 and the output shaft to increase the speed even further. When the displacement of the hydrostatic unit 44 reaches zero, the rotor for the hydrostatic unit 44 no longer rotates. A hydrostatic lockup occurs and all of the torque then is transmitted mechanically, the speed ratio being determined by the planetary gear ratio and the forward drive gearing ratio.

If the hydrostatic unit 44 is stroked overcenter to a negative displacement position, it becomes a pump and it is driven by the carrier 156. The function of the hydrostatic unit 44 also changes and it acts as a motor. This causes an overdrive condition to be achieved although an increase in the internal hydrostatic horsepower torque transfer is achieved as a reaction torque for the hydrostatic units is increased. This tends to decrease the overall efficiency of the driveline relative to the efficiency that was experienced during operation in the lower operating speed range.

A shift from the low range to the high range can be achieved in an embodiment such as that illustrated in FIG. 5. When a hydraulic lockup occurs at this time no torque is present on the high low shift clutches.

In FIG. 6 I have illustrated the relationship between ground speed and drawbar pull for both the high range and the low range. Drawbar pull variations are achieved by varying the relative displacements of the hydrostatic units. The same plot of FIG. 6 illustrates the relationship of efficiency to ground speed as the drawbar pull is changed upon adjustment of the relative displacement of the hydrostatic units. The mechanical efficiency tends to fall off at higher road speeds as the transmission assumes an overdrive condition. This is illustrated in FIG. 6. This minor disadvantage, however, is offset by the increase in efficiency that is achieved during operation in the low speed range. Most of the operating time for a tractor installation for agricultural or industrial vehicle drivelines occurs in the low speed range and the advantages of a split torque delivery path in that drive range make the transmission feasible from an efficiency standpoint. This is in contrast to hydrostatic tractor drivelines of known construction.

Having described a preferred embodiment of my invention, what I claim and desire to secure by U.S. Letters Patent is:

1. A hydrostatic power transmission mechanism for transferring torque from an engine to a driven shaft comprising a planetary gear unit and two hydrostatic units, said planetary gear unit comprising a ring gear member connected to said engine, a sun gear member, a planet carrier member, and planet pinions journalled on the carrier in meshing engagement with said sun and ring gear members, one of said planetary gear members being connected to said engine, said hydrostatic mechanism comprising a hydrostatic pump and motor unit situated in a closed hydrostatic circuit, means for varying the displacements of said hydrostatic pump and motor units, each hydrostatic unit comprising a hydrostatic drive member and a hydrostatic driven member, a geared connection between one member of a first of said hydrostatic units and a second member of said planetary gear unit whereby torque may be delivered therebetween, a mechanical connection between the third member of said planetary gear unit and one member of a second of said hydrostatic units so that torque may be delivered therebetween, both said third member and said one member of said second hydrostatic unit being in mechanical driving relationship with said driven shaft, the displacement of said first hydrostatic unit being a minimum and the displacement of said second hydrostatic unit being maximum during initial acceleration from a standing start whereby a split torque delivery path is established between said engine and said output shaft with a portion of the torque being transferred hydrostatically and the balance of the torque being transferred mechanically, and means for varying the relative displacements of said hydrostatic units to effect a speed ratio change.

2. The combination set forth in claim 1 wherein the geared connection between said second hydrostatic unit and the third member of said planetary gear unit comprises a high speed ratio gear range and a low speed ratio gear range and clutch means for selecting said high and low speed ratio gear ranges to effect an overall speed ratio range of high torque multiplication or lower torque multiplication depending upon the load on said driven shaft.

3. The combination set forth in claim 1 wherein the geared connection between the third member of said planetary gear unit and said driven shaft comprises forward drive gearing and reverse drive gearing in parallel disposition and forward-and-reverse clutch means for selectively activating and deactivating said forward drive gearing and said reverse drive gearing.

4. The combination set forth in claim 2 wherein the geared connection between the third member of said planetary gear unit and said driven shaft comprises forward drive gearing and reverse drive gearing in parallel disposition and forward and reverse clutch means for selectively activating and deactivating said forward drive gearing and said reverse drive gearing.

* * * * *